United States Patent Office

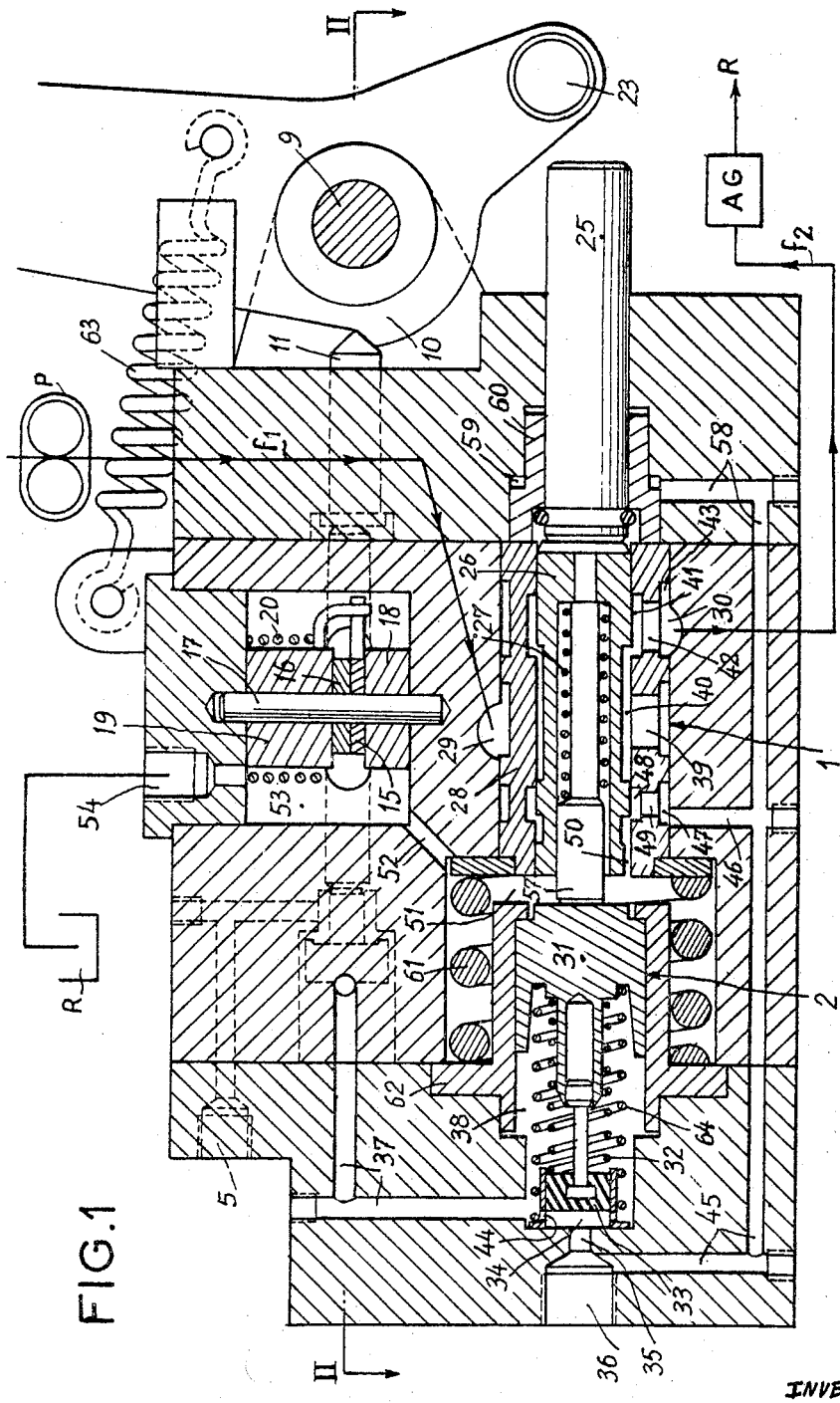

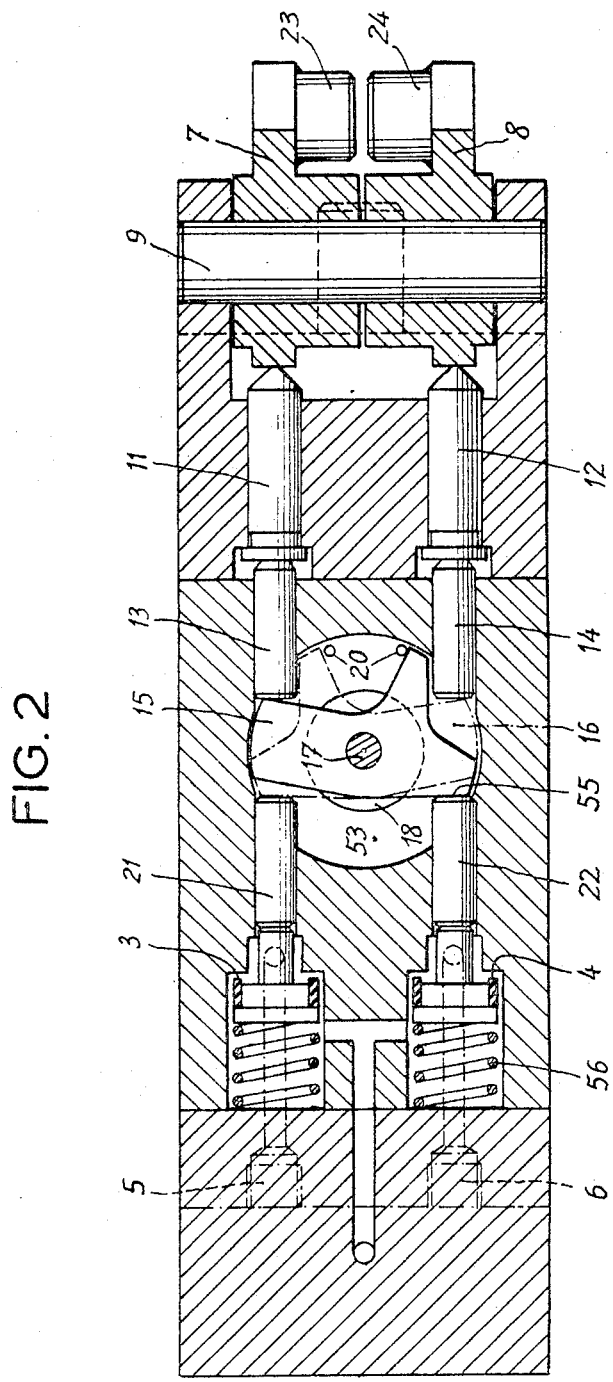

3,431,030
Patented Mar. 4, 1969

3,431,030
HYDRODYNAMIC BRAKING DEVICES WITH HYDROSTATIC SAFETY FEATURE FOR TRACTOR VEHICLES WITH OR WITHOUT TRAILERS
Raymond Boueil and Gérard Gardeux, Billancourt, France, assignors to Regie Nationale des Usines Renault, Billancourt, Hauts-de-Seine, France
Filed Oct. 24, 1967, Ser. No. 677,696
Claims priority, application France, Nov. 23, 1966, 84,635
U.S. Cl. 303—7
Int. Cl. B60t 13/00; F16b 7/00
10 Claims

ABSTRACT OF THE DISCLOSURE

In this device the brake pedals act in succession on a selector, a hydrodynamic braking distributor and through the latter on a master cylinder, said distributor comprising two concentric slide valves one of which permits isolating the fluid reservoir from the valves of the brake selector, causing said valves to communicate with the fluid hydrodynamic circuit and producing a fluid pressure increment in the brake lines, the other slide valve, during its movement, causing said pressure to be adjusted, the master cylinder causing in turn, under the control of the first slide valve, the safety brake application in case of stoppage of the hydrodynamic circuit feed pump.

---

This invention relates to a hydrodynamic braking device having a hydrostatic safety characteristic, notably for braking the wheels of a tractor and, if necessary a trailer coupled thereto, by using an open-center hydraulic circuit utilizing the hydrodynamic power supplied by the hydraulic power pump of the vehicle. This invention is concerned more particularly with a braking device which is to have an absolute precedence in time, or an absolute priority, in the operation of the general hydraulic circuit of the tractor vehicle but without having any repercussion whatsoever on the operation of the other members and devices incorporated in said hydraulic circuit, such as the device for retracting or lifting farming equipment or the like, and without being affected by the operation of these other members or devices.

Hydrodynamic braking devices are already known wherein, in case of stoppage of the engine, which causes the pressure fluid flow to be discontinued, a master cylinder controlled by the brake pedals permits nevertheless applying the tractor brakes according to the conventional hydrostatic process. In these known devices this hydrostatic brake application is usually obtained by resorting to a high-pressure fluid accumulator.

It is the specific object of the present invention to provide a device in which this accumulator can be dispensed with and which provides in a simple yet efficient manner a hydrostatic safety braking action by adequately controlling a master cylinder.

The hydrodynamic braking system with hydrostatic safety feature according to this invention, which comprises a hydrodynamic braking distributor, a master cylinder and a valved selector responsive to a pair of brake pedals for the unilateral braking of the tractor wheels, is characterised in that the brake pedal or pedals act in succession on the selector, the hydrodynamic braking distributor and through the latter on the master cylinder, and that said distributor comprises two concentric slide valves one of which, during its movement, permits isolating the fluid reservoir from the valves of said brake selector and opening the communication between said valves and the hydrodynamic fluid circuit, and thus cause the pressure of this fluid to rise in the brake lines, this fluid pressure being adjusted automatically by the other slide valve during its movement, said master cylinder controlling in turn, under the control of the first slide valve of said distributor, the safety or emergency brake application in case of stoppage of the pump feeding the hydrodynamic circuit.

The features and advantages of the device of this invention will appear as the following description proceeds with reference to the accompanying drawings illustrating diagrammatically by way of example a typical form of embodiment thereof. In the drawings:

FIGURE 1 illustrates in axial section a brake control unit according to this invention and its hydraulic pipe lines, and FIGURE 2 is a section taken along the line II—II of FIGURE 1.

The device according to this invention comprises essentially in a compact unit or block a hydrodynamic brake distributor 1, a safety master cylinder 2 and a brake selector for controlling unilateral brake applications. This selector comprises a pair of valves 3 and 4 communicating via ducts 5 and 6 with the left-hand and right-hand brakes of the tractor, respectively, whereby the driver may actuate at will the left-hand and/or the right-hand wheels of the tractor, with an equal fluid pressure in each wheel.

To this end, two brake pedals, i.e. a left-hand pedal 7 and a right-hand brake pedal 8, are fulcrumed about a pivot pin 9 and control by means of cam members 10 a pair of push-rods 11 and 12 producing through the medium of sliding members 13 and 14 the rotation of a pair of members 15 and 16 mounted for free rotation about a pivot pin 17 and retained between a pair of opposite cylindrical members or washers 18 and 19. A toroidal spring 20 constantly urges these members 15 and 16 to the inoperative position illustrated in the drawing, which corresponds to the inoperative or undepressed brake pedal position. In this position, the brake pedals 7 and 8 are free and the members 15 and 16 keep the selector valves 3 and 4 open through the intermediary of sliding rods 21 and 22.

The brake pedals 7 and 8 carry abutment members 23 and 24 adapted to bear separately or simultaneously against a push member 25 engaging a slide valve 26 of the hydrodynamic brake distributor 1. This slide valve responsive to a return spring 27 is adapted to slide inside another concentric slide valve 28 of the distributor, which communicates via a port 29 with the delivery side of a power pump P driven from the tractor engine and feeding fluid under pressure along the path shown in diagrammatic form by the arrows $f_1$. This fluid flows into chamber 30 to feed the other hydraulic devices of the tractor, such as the members or actuators provided for lowering and raising the farming equipment or implements designated in FIG. 1 by AG, as shown by the diagrammatic path $f_2$, before returning to the fluid reservoir R.

The safety master cylinder 2 following the distributor 1 comprises a piston 31 adapted to control a valve 33 through the medium of a coil compression spring 32. This valve 33 is movable in a chamber 34 and permits closing the port 35 communicating with another orifice 36 to which a connecting line may be adapted, if desired, for controlling the brakes of a trailer. A duct 37 connects the cylinder 38 of said master cylinder to the brake selector valves 3 and 4.

When the brake pedals 7 and 8 are inoperative the fluid from pump P which is delivered to distributor 1 at 29 flows through a port 39 of slide valve 26, then in grooves 40 and 41, another port 42 and another groove 43 of slide valve 28, and then into chamber 30. In this inoperative position of slide valves 26 and 28 as shown in FIGURE 1 the fluid passage is isolated from the brake circuit and therefore the pressure variations caused by the operation of the other hydraulic elements of the tractor have no influence whatsoever on the brakes.

In the same inoperative position of the brake pedals the valves 3 and 4 of the selector device are open and the right-hand and left-hand brake cylinders communicate with the fluid reservoir R via said valves 3 and 4, and ducts 37, chamber 34 of master cylinder 2 communicating via ports 44 with cylinder 38 and ducts 37, then via ducts 45 and 46, grooves 47 and 48, and passage 49 of slide valve 28, the notch 50 of slide valve 26, cylinder 51, port 52 in the distributor body, recess 53 and duct 54. Under these conditions, the brake cylinders are at zero fluid pressure.

When the driver depresses only one pedal, for example the left-hand pedal 7, the latter pivots about pivot pin 9, and the cam 10 depresses the push-rod 11, thus moving the rod 13 to the left and causing in turn the movement of rotation of member 15 about said pivot pin 17. The face 55 of member 15 is thus moved away from rod 22, so that the spring 56 can close the valve 4 while the other rod 21 keeps the valve 3 open. As a result, the right-hand brake is isolated from the brake control device and only the left-hand brake is responsive to fluid pressure variations controlled by the action exerted by the driver on the left-hand brake pedal 7, as will be explained presently.

If both pedals are depressed simultaneously, both selector valves 3 and 4 are kept open and the two tractor brakes are caused to communicate with the brake control device. When the pedal or pedals are released after a brake application, the valves 3 and 4 are reopened by the action exerted by the toroidal spring 20 restoring the members 15 and 16 to their inoperative positions.

The action exerted by the driver's feet on each pedal 7, 8, while causing the above-described brake selection, is also attended by a movement to the left, as seen in the drawing, of the push member 25 engaged separately or simultaneously by the abutment members 23 and 24 of the pedals. During this movement, the push member 25 carries along in the same direction the slide valve 26 while compressing the coil spring 27 retained by a rod 57 bearing against the piston 31 of master cylinder 1. As the spring pressure of the master cylinder is greater than the pressure to be exerted by the compressed spring 27, the rod 57 remains stationary.

The movement of slide valve 26 to the left cut off the communication between groove 48 and cylinder 51, and the passage between valves 3 and 4 and reservoir R, as described therebefore thus isolating the brake from reservoir R and opening the communication between the grooves 48 and 40 of both slide valves 26 and 28, or otherwise stated between the brake cylinders and the output of pump P through ducts 37, port 44, chamber 34, ducts 35, 45 and 46, groove 47, passage 49, grooves 48 and 40, and ports 39 and 29. Moreover, this movement causes the fluid passage between grooves 40 and 41, i.e. between the fluid inlet $f_1$ and the fluid outlet $f_2$, to be throttled.

This last operation is attended by an increase in the fluid pressure in groove 40 and therefore in the pipe line leading to the brake cylinders from the port 49 communicating with said groove 40. This fluid pressure also propagates via duct 58 into an annular chamber 59 in which it actuates a differential piston 60 sliding on the push member 25 and contacts the slide valve 28 so as to move same to the left, as seen in the drawing, while compressing an antagonistic spring 61. The movement of slide valve 28 is attended by an accurate adjustment of the throttling produced between grooves 40 and 41, so that the fluid pressure having exactly the value necessary for the desired brake application is obtained. The longer the stroke of the first slide valve 26 to the left, the higher the fluid pressure must be in the annular chamber 59 and therefore in the brake cylinders, for moving the other slide valve 28 to its proper throttling position for this pressure is attended by a variable compression of spring 61. Briefly, the value of the fluid pressure delivered to the brakes depends on the position of slide valve 26.

To move this slide valve the driver's foot depressing the pedal has only a relatively weak resistance to overcome, i.e. the force of spring 27. Under these conditions the only function of the pedal movement consists somewhat in displaying a position corresponding to a certain fluid pressure and therefore to a certain braking force, without requiring any other control effort from the driver than the force corresponding to that of the return spring 27. To make the foot "feel" the braking action, return springs 63 are secured to each pedal 7 and 8 so that the effort exerted on the pedal during a brake application increases in proportion to the braking intensity, these springs subsequently restoring the brake pedals to their initial positions after each brake application.

When the pedal or pedals 7, 8 is or are released after a brake application, the slide valve 26 and push member 25 are returned to their initial position by the spring 27. Thus, the fluid communication is restored between port 49 and cylinder 51 and therefore between the reservoir R and the brake cylinders, and also with the annular chamber 59 of piston 60. The fluid pressure is therefore relieved in this chamber so that the antagonistic spring 61 will move the slide valve 28 and piston 60 to their initial positions.

If the hydraulic circuit of the tractor is already under pressure when a brake application is effected, for example as a consequence of the operation of another hydraulic device of the tractor, and as long as this pressure exceeds the value required for the brake application, the distributor 1 acts as a means for relieving this pressure between the grooves 40 and 48. Then the distributor operates as follows:

After the action upon the brake pedals has moved the slide valve 26 to the position corresponding to the desired braking force, the fluid pressure prevailing in the circuit is transmitted to the open passage between grooves 40 and 48 and directed against the piston 60 which moves the slide valve 28 to the left, as seen in the drawing, until the pressure in chamber 59 is sufficient to compress the spring 61, thus re-closing the passage between grooves 40 and 48 and cut-off the communication between the hydraulic circuit under pressure of the tractor and the brake circuit. Thus, the pressure in the brake cylinders is maintained independently of that prevailing in the general hydraulic circuit of the tractor.

In case the pressure valve resulting from the actuation of another hydraulic member or device were not sufficient to ensure an efficient brake application, the operation of the distributor will be as described first hereinabove, except that the loss of pressure caused by the throttling of the fluid passage between grooves 40 and 41 is not equal to the total pressure demanded by the brake application but only to the difference between this braking pressure and that prevailing in the circuit to which this difference is thus added.

In case of stoppage of the engine and therefore of the power pump P, the tractor wheels will be braked by the hydrostatic pressure available in the master cylinder 2, but the trailer brakes are not actuated.

During this operation, as the hydrodynamic pressure has dropped the slide valve 26 moved as a consequence of the action exerted by the depressed pedal or pedals on the push member 25 acts as an intermediate push member engaging the piston 31 of the master cylinder to move same leftward against the force of a return spring 64. The movement of piston 31, transmitted via spring 32 and valve 33, will close the port 35, thus isolating the braking circuit of the trailer.

Simultaneously, the piston 31 will cause the fluid pressure to rise in cylinder 38, this pressure being transmitted to the wheel brakes of the tractor via duct 37 and ports 5 and 6, and the open valves 3 and 4.

When the brake pedal resumes its initial position after a brake application, the piston 31 is likewise returned to its initial position by the spring 64, so as to restore the valve 33 to its right-hand position and re-insert the trailer brakes into the hydraulic circuit.

The fluid flowing from reservoir R through the duct 54, cavity 53, port 52 in the distributor body, cylinder 51, notch 50 of slide valve 26, grooves 48 and 47 and port 49 of slide valve 28, ducts 45 and 46, port 35 and port 44, will fill up the cylinder 38 of master cylinder 2.

Although specific shapes and parts are illustrated in the exemplary form of embodiment described hereinabove with reference to the attached drawings, it will be readily understood by anybody conversant with the art that these shapes and parts are given for illustrative purpose only and that many modifications and variations may be brought thereto.

What is claimed is:

1. A hydrodynamic braking device having a hydrostatic safety characteristic, notably for braking the wheels of a tractor and, if necessary, a trailer coupled thereto, by means of an open-center hydraulic circuit fed by a fluid pump, said device comprising a hydrodynamic braking distributor, a master cylinder having a control valve adapted to communicate with said trailer brakes, and a selector comprising a pair of valves adapted to communicate with said master cylinder control valve, with a fluid reservoir and with the tractor wheel brakes, a pair of brake pedals for the unilateral braking of the tractor wheels and being operatively connected to selectively actuate in succession the selector, the hydrodynamic braking distributor and the master cylinder through the latter, and said distributor comprising two concentric slide valves one of which has outer grooves and the other both inner and outer grooves adapted to communicate with said fluid circuits, one of said slide valves, during its movement, permitting isolation of the fluid reservoir from the valves of said brake selector and opening the communication between said selector valves and the hydrodynamic fluid circuit and to cause the pressure of the fluid in the brake lines to rise, this fluid pressure being adjusted automatically by the other slide valve during its movement, said master cylinder being under the control of the first slide valve of said distributor and controlling the safety brake application in case of stoppage of the pump feeding the hydrodynamic circuit.

2. A hydrodynamic braking device according to claim 1, further comprising means by which each brake pedal is adapted to actuate a valve of said selector, said means comprising two members engaging said valves and mounted to pivot about an axis, spring means constantly urging said pivoting members to restore said valves to their open condition, and pushrod means responsive to said pedals and adapted to cause one of said two members to pivot.

3. A hydrodynamic braking device according to claim 2, further comprising springs urging the brake pedals to their inoperative position, said springs requiring, in case of a brake application, the exertion on said pedals of an effort increasing in proportion to the desired braking intensity.

4. A hydrodynamic braking device according to claim 3, in which the braking pressure produced by the device is proportional to the pedal stroke communicated to the first slide valve and therefore to a given effort by a return spring.

5. A hydrodynamic braking device according to claim 1, further comprising push member means responsive to each said brake pedal and adapted to move the inner slide valve of the distributor which slides within the other slide valve thereof against the resistance of a return spring to shut the passage between the fluid reservoir and a groove of said other slide valve which communicates with the valves of said brake selector, to simultaneously open communication between two other grooves of said slide valves and permit the flow of pressure fluid from said pump to said selector valves, and throttle the fluid passage to exhaust.

6. A hydrodynamic braking device according to claim 5, in which said first distributor slide valve, during the subsequent portion of its movement caused by the actuation of said brake pedals, is adapted to move in turn, against a return spring, a piston of said master cylinder having a spring-loaded valve normally closing the delivery of brake fluid to the trailer and when said hydrodynamic circuit feed pump is stopped for any reason, said master cylinder piston compressing the fluid contained in said master cylinder and keep it in communication with the valves of the brake selector.

7. A hydrodynamic braking device according to claim 6, in which the return spring associated with the first slide valve of the distributor reacts against a sliding rod engaging the piston of the master cylinder.

8. A hydrodynamic braking device according to claim 7, in which the force necessary for compresing said return spring is inferior to the force of the inner springs of said master cylinder.

9. A hydrodynamic braking device according to claim 1, further comprising a piston engaging the second slide valve of said distributor and formed with a chamber communicating at the rear end of said piston with a duct interconnecting the distributor and the brake cylinders, said piston being slidably mounted on the push member of said first slide valve responsive to an increment in the fluid pressure which is caused by the throttling of its passage to move said other slide valve against a spring bias.

10. A hydrodynamic braking device according to claim 1, in which it selectively operates as a throttling device when no pressure prevails in the open-center circuit of the hydraulic system, and as a pressure-reducing device, so as to prevent the introduction of an additional loss of pressure constituting a cause of wasted energy.

References Cited

UNITED STATES PATENTS

| | | | |
|---|---|---|---|
| 2,556,287 | 6/1951 | Milster | 188—152 |
| 3,278,239 | 11/1966 | Klaus et al. | 303—5 X |

FERGUS S. MIDDLETON, *Primary Examiner.*

JOHN J. McLAUGHLIN, JR., *Assistant Examiner.*

U.S. Cl. X.R.

60—52, 54.5; 188—152; 303—2, 10, 13, 53